(No Model.)
W. BEISER.
PULVERIZER.
No. 509,357. Patented Nov. 28, 1893.
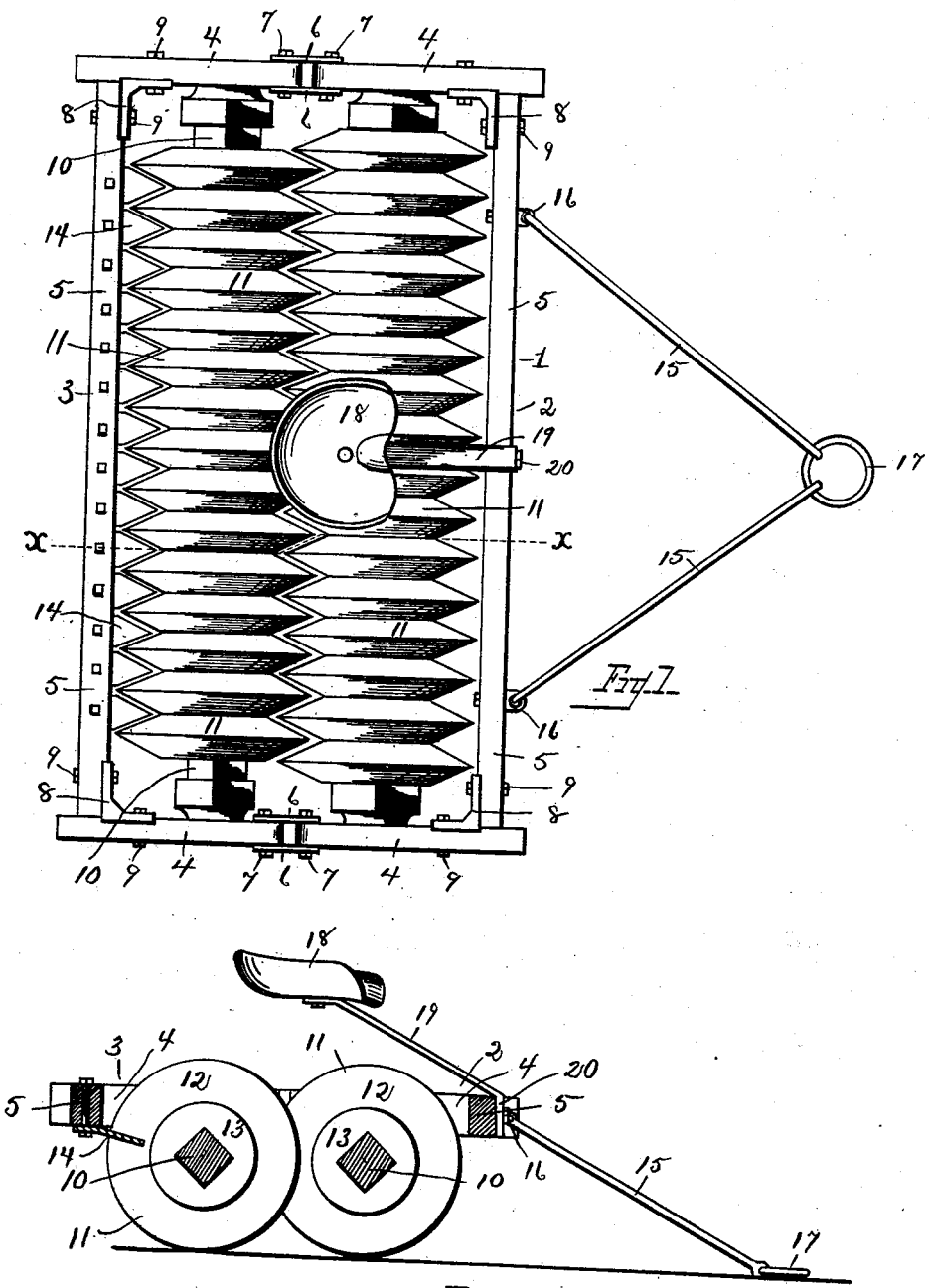

UNITED STATES PATENT OFFICE.

WILLIAM BEISER, OF MARSEILLES, ILLINOIS.

PULVERIZER.

SPECIFICATION forming part of Letters Patent No. 509,357, dated November 28, 1893.

Application filed October 27, 1892. Serial No. 450,128. (No model.)

*To all whom it may concern:*

Be it known that I, WILLIAM BEISER, of Marseilles, county of La Salle, and State of Illinois, have invented certain new and useful Improvements in Pulverizers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a combined pulverizer and harrow, and has relation to that class employed in pulverizing and evening the soil in its preparation for the seed.

The object of the invention is to construct a device of that class described having a rectangular frame, shafts mounted in the frame in parallel alignment with the front and rear sides thereof, disks mounted on the shafts having V shaped working edges in parallel alignment to the direction of travel of the device, whereby the ground is broken up and left with a pulverulent even surface.

A further object is to provide for an efficient device of the class described for use on uneven ground, which object is attained by employing a plurality of sets of disks, each set having an independent shaft journaled in the frame, the frame being jointed to allow each set of disks to act independently.

A still further object is to provide for cleaning the disks, which object is attained by means of cleaners secured to the frame and extending in contact with the rear set of disks, the rows being in such close relation that they are cleaned by the rear or adjacent row.

The invention consists in the parts and combination of parts as are shown in the drawings, described in the specification, and pointed out in the claim.

In the drawings: Figure 1 is a plan view of a complete pulverizer and harrow constructed in accordance with my invention, and Fig. 2 is a sectional elevation of the same on lines X—X.

1 designates the frame of the device, being formed of two sections 2, and 3. Each section of the frame consists in longitudinal side bars 4 and end bars 5, the latter being of a length to extend one half of the width of the frame, the inner ends of the bars being pivotally united by means of plates 6, one arranged upon each side and held by bolts 7, thereby allowing one section to swing independently of the other.

In order to render the frame rigid with reference to torsional strain, corner irons 8 are secured upon the inner side of each corner by means of bolts 9 passed through both end and side bars and the corner irons, whereby the frame will maintain a rectangular shape at all times.

10 designates parallel shafts journaled in bearings upon the end bars and upon which a plurality of disks are secured. Each disk is formed with a V shaped periphery 12 and flat sides 13 through which a rectangular opening is formed to receive the shaft.

Shafts 10 are journaled in such relation to each other that the V shaped peripheries 12 of the rear set of disks 11 will clean the other set of all mud or dirt that accumulates thereon, there being V shaped cleaners 14 secured to, the rear side bar 4 and extending in close proximity to the rear set of disks.

In order to allow the front section of the frame to have a free swinging motion to conform to undulations I secure the team thereto by means of bars 15 loosely connected with the frame at 16, and united in a ring 17 to which the double tree is attached.

18 designates a seat secured upon a spring bar 19 which is attached to the frame at 20, whereby the weight of the rider will cause the forward or initial set of disks to meet the larger clods of earth without riding over them.

In the operation of the apparatus the hinged relation of the draft rods, and frame sections allow the frame to conform to all irregularities of surface of the earth and cause the disks to pulverize all of the earth.

It will be apparent that I may employ round shafts and form the disks with circular openings, in which event the disks revolve upon the shafts.

What I claim is—

In a pulverizer, a frame comprising two like sections hinged together, draft rods pivotally united with one of the sections, a seat upon the same section and parallel shafts one journaled in each section, disks upon the shaft forming V shaped peripheral recesses when assembled, the peripheries of the disks upon one shaft revolving in the recesses formed by the disks upon the adjacent shaft, and a cleaner upon the frame having V shaped projections to enter the recesses and clean the disks.

In testimony that I claim the foregoing as my own I hereby affix my signature in presence of two witnesses.

WILLIAM BEISER.

Witnesses:
R. C. HANNEMANN,
H. CARRIER.